(12) United States Patent
Crawford (10) Patent No.: US 8,172,179 B2
(45) Date of Patent: May 8, 2012

(54) AIRCRAFT WING BOX AND MANUFACTURE THEREOF

(75) Inventor: Tristan Crawford, Bristol (GB)

(73) Assignee: Airbus Operations Limited, Bristol (GB)

( * ) Notice: Subject to any disclaimer, the term of this patent is extended or adjusted under 35 U.S.C. 154(b) by 653 days.

(21) Appl. No.: 12/309,040

(22) PCT Filed: Jul. 19, 2007

(86) PCT No.: PCT/GB2007/050416
§ 371 (c)(1),
(2), (4) Date: Jan. 5, 2009

(87) PCT Pub. No.: WO2008/012569
PCT Pub. Date: Jan. 31, 2008

(65) Prior Publication Data
US 2009/0206203 A1    Aug. 20, 2009

(30) Foreign Application Priority Data

Jul. 28, 2006  (GB) .................................. 0615104.7

(51) Int. Cl.
*B64C 3/18* (2006.01)
(52) U.S. Cl. .................................................... 244/123.7
(58) Field of Classification Search .............. 244/123.1, 244/123.7, 123.8, 124, 133, 132
See application file for complete search history.

(56) References Cited

U.S. PATENT DOCUMENTS 1,854,330 A * 4/1932 Gustave ......................... 244/124
(Continued)

FOREIGN PATENT DOCUMENTS
EP        0 739 661    10/1996
(Continued)

OTHER PUBLICATIONS

UK Search Report for GB0615104.7 dated Nov. 17, 2006.
(Continued)

*Primary Examiner* — Galen Barefoot
(74) *Attorney, Agent, or Firm* — Nixon & Vanderhye, PC (57) ABSTRACT

An aircraft wing box comprises a pair of half ribs (18, 20) joined to form a rib extending from an upper wing skin (12) to a lower wing skin (10). Each half rib (18) comprises a base (19) and a plurality of projections (4) that extend away from the base (19), the projections (4) defining a series of troughs (2*a*) and peaks (4*a*). Respective projections of one half rib (18) overlap with respective projections of the other half rib (20) thereby defining overlapping portions (3), the half ribs (18, 20) being joined in the regions of the overlapping portions (3). There may be projections (4) shaped such that the overlapping portion (3*b*) defined by the two projections is separated from the neutral axis N of the rib (18, 20). The half ribs may be joined in the regions of the overlapping portions (3) by means of a fixing arrangement (7) that enables the position of joining of the half ribs to be adapted during initial assembly of the half-ribs (18, 20) to accommodate relative movement of the half ribs in a direction substantially parallel to the plane of one of the half ribs. The half ribs (18, 20) may be formed by deforming extruded metal sections. During assembly, in-wing systems (32) may be inserted before joining two wing-box halves.

35 Claims, 8 Drawing Sheets

U.S. PATENT DOCUMENTS

| | | | |
|---|---|---|---|
| 2,233,969 A * | 3/1941 | Woods | 244/123.8 |
| 2,275,037 A * | 3/1942 | Watter | 52/578 |
| 2,360,433 A * | 10/1944 | Magruder | 244/123.7 |
| 2,403,569 A | 7/1946 | Watter | |
| 2,558,819 A * | 7/1951 | Chausson | 244/124 |
| 3,096,958 A | 7/1963 | Koontz | |
| 4,481,703 A * | 11/1984 | Scott | 244/123.1 |
| 5,246,340 A * | 9/1993 | Winstanley et al. | 416/233 |
| 6,513,757 B1 * | 2/2003 | Amaoka et al. | 244/123.7 |
| 7,182,293 B2 * | 2/2007 | Sarh | 244/123.7 |
| 2005/0236524 A1 | 10/2005 | Sarh | |

FOREIGN PATENT DOCUMENTS

| | | |
|---|---|---|
| FR | 694343 | 4/1930 |
| GB | 188055 | 10/1922 |
| GB | 194516 | 3/1923 |
| GB | 365300 | 1/1932 |
| GB | 571990 | 9/1945 |
| GB | 2 254 892 | 10/1992 |
| WO | WO 2005/110842 | 11/2005 |

OTHER PUBLICATIONS

UK Search Report for GB0615104.7 dated Jun. 27, 2007.

International Search Report and Written Opinion dated Jan. 9, 2009 for PCT/GB2007/050416.

* cited by examiner

Fig 1

(Prior art)

AIRCRAFT WING BOX AND MANUFACTURE THEREOF

This application is the U.S. national phase of International Application No. PCT/GB2007/050416 filed 19 Jul. 2007 which designated the U.S. and claims priority to British Patent Application No. 0615104.7 filed 28 Jul. 2006, the entire contents of each of which are hereby incorporated by reference.

BACKGROUND OF THE INVENTION

The present invention relates to a wing box and a method of manufacturing a wing box. In particular, the invention relates to an aircraft wing box, a method of manufacture thereof, a method of designing a wing box, and a rib structure for use in a wing box.

Aircraft wing boxes are typically manufactured by forming a sub-structure by assembling non-formable components (for example including ribs and/or spars) and then mounting preformed wing covers on the sub-structure so formed. However, build-up of tolerances between the non-formable components makes it difficult to obtain an accurate connection of the wing cover to the sub-structure and difficult to achieve the desired aerodynamic profile. Thus, the build-up of tolerances may result in the mismatching/misfitting of the surfaces of the wing covers and the corresponding surfaces of the substructure at which the wing covers are joined thereto. Such problems have been solved by means of removing or adding material as appropriate by means of "fettling" or using "shims", respectively. However, whilst such measures may allow the components to be flush before fastening, the addition or removal of material may affect the aerodynamic profile such that the profile is different from the desired profile.

Also fastening covers onto the substructure using fasteners requires the covers to have a certain thickness in the region of each fastener in order for the fastening to be sufficiently structurally strong. This increased thickness increases the mass of the covers. The mass of the wing covers is typically significantly greater than the mass of the ribs in the wing. It is desirable to reduce the mass of the aircraft, whilst not otherwise reducing performance or structural properties of the aircraft.

It is typical for certain in-wing systems, such as actuators, fuel systems and the like, to be integrated into the structure after at least some of the wing covers have been mounted onto the sub-structure. This complicates assembly of the wing box, but follows from the construction process outlined above, in which the covers are formed onto the substructure.

The present invention relates to an aircraft wing box, wherein the wing box comprises at least a pair of half ribs joined to form a rib extending from an upper wing skin to a lower wing skin. In certain embodiments of the invention, the aircraft wing box is assembled from two wing box halves, each wing box half comprising at least one half rib, and preferably a multiplicity of half ribs, each of which being joined to a half rib of the other wing box half. Utilising such a construction may have many benefits in accordance with embodiments of the present invention, as is explained in further detail below.

DESCRIPTION OF THE RELATED ART

It is known to assemble half-shells to form a wing box. For example, WO 2005/110842 (The Boeing Company) describes an airfoil box, for example a wing, made from two composite half-shell structures. Each composite half-shell structure is a unitary (or integrally formed) structure (i.e. without seams). The proposals of WO 2005/110842 are made with the aim of reducing weight by reducing the number of joints requiring fasteners required by the wings of the prior art, which are made from separate components (for example, spars, ribs, stringer and wing covers) which are subsequently fastened to each other during assembly. Connection members are provided on each half-shell structure to enable the two half-shell structures to be joined together. The connection members include longitudinal I-beams (spar-like members that extend longitudinally along the half-shell and transversely to the ribs thereof). In one embodiment of WO 2005/110842 the connection members include members provided on half ribs integrally formed as part of the half shell. In respect of some of the half ribs, the connection members are in the form of each half rib having a portion that extends along the entire length of each half rib that overlaps with a corresponding portion of the other half rib. In respect some of the other half ribs, the connection members are in the form of each half rib having castellations (i.e. crenulations) that define overlapping tab portions. A schematic illustration (not to scale) of two such half ribs is shown in FIG. 1.

Figure 1:
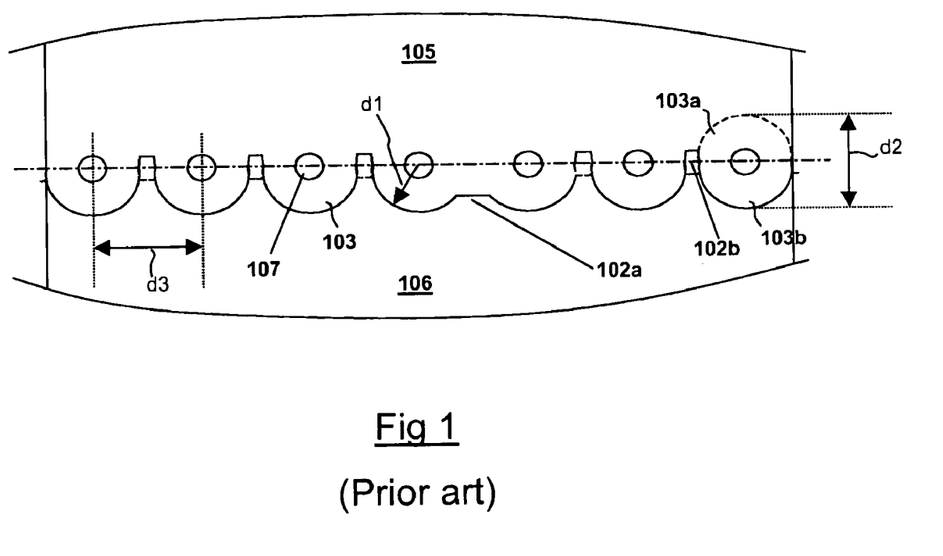
FIG. 1 is a sectional view of a wing box according to the prior art.

FIG. 1 (showing the prior art arrangement) shows an upper half-shell structure 105 connected to a lower half-shell structure 106 by means of overlapping tab portions 103. Each tab portion 103a on one half-shell structure 105 overlaps with a respective tab portion 103b (one of which being shown by broken lines in FIG. 1) on the other of the half-shell structures 106 to the extent necessary to allow a fastener 107 to be passed through the two overlapping tab portions 103a, 103b. The half ribs of the half-shell structures 105, 106 do not overlap in the gaps 102b between the tab portions, and thus, free space is defined between the half ribs at the gaps 102b between tab portions 103. Such free space is stated in WO 2005/110842 to reduce the weight of each half rib. The total surface area of the free space between the half ribs when viewed as a cross-section taken about the cross-section that bisects the web of the rib appears (from the drawings of WO 2005/110842) to be less than about a tenth of the total surface area of the web of the rib. The height of each gap that defines the free space between the half ribs, when viewed in the same cross-section, appears (from the drawings of WO 2005/110842) to be less than about a quarter of the height of the web of the rib at the region of the gap. If one were to design and manufacture half ribs in accordance with the teachings of WO 2005/110842, it is thought likely that the dimensions of the tab portions and their arrangement relative to each other would, in practice, be chosen in consideration of various factors. Thus, the tab portions 103 would need to overlap enough to provide sufficient structural strength for the fasteners to join the half ribs to each other (dimensions d1 and d2), but the mass of the ribs should be minimised, for example, by means of lightening voids 102a, 102b provided by means of the removal of redundant material from the design. Where fasteners are sufficiently widely spaced, the distance (dimension d3) between them exceeds the requirement for minimum edge distance (dimension d1) such that material is not physically required, resulting in a void 102b which contributes to the reduced weight of the combined part. The fasteners 107 that attach the respective connection members lie in the neutral plane, namely the plane of minimum bending stress, which is approximately midway between the upper and lower wing skins.

SUMMARY OF THE INVENTION

According to a first aspect of the invention, there is provided an aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions, there is at least one projection shaped such that the separation, measured in a direction parallel to the height of the rib, between the peak defined by the projection and the adjacent trough is greater than half the height of the half rib in the region of the projection.

Providing, such a projection, in which the projection is relatively tall, may provide several different benefits. For example, if the tall projection defines a tall void, that void may provide benefits in relation to the positioning of in-wing systems. Also, if the tall projection is defined by means of a trough that is close to the base of the half rib, then such a geometry may be of benefit during manufacture of the half-rib. Such possible benefits are discussed in further detail below.

In relation to this aspect of the invention, it is stated that there is at least one projection shaped such that the separation between the peak defined by the projection and the adjacent trough is greater than half the height of the half rib. Instead, there may be at least one projection shaped such that the separation, measured in a direction parallel to the height of the rib, between the peak defined by the projection and the adjacent trough is greater than a quarter of the height of the whole rib (comprising the two half ribs) in the region of the projection. Also, there may additionally, or alternatively, be at least one projection shaped such that the separation between a trough adjacent to the projection and the nearest region of wing skin is less than a quarter of the separation between the peak defined by the projection and the nearest region of wing skin.

At least one projection may be shaped such that the separation between a trough adjacent to the projection and the nearest region of wing skin is less than 20%, more preferably less than 15% and possibly less than 10%, of the separation between the peak defined by the projection and the nearest region of wing skin. Such a geometry may require that the trough is relatively close to the base of the half rib. Such a geometry may assist manufacture of the rib (discussed in greater detail later).

A void may be defined between two adjacent projections. The void may additionally be defined between opposing troughs of respective half ribs. The void may for example extend from a trough adjacent to one of the two adjacent projections to the opposite trough that is adjacent to the other of the two projections. The void may be shaped such that the separation of the troughs defining the void, measured in a direction parallel to the height of the rib, is greater than the greatest width of the void (measured in a direction parallel to the chord of the wing box in the region of the half rib).

The provision of such a void may lighten the mass of the rib formed of the two rib halves.

Preferably, the void has a maximum height greater than its maximum width. The void may have a maximum height greater than twice its maximum width, and possibly greater than three times its maximum width. Having a tall void may again assist manufacture of the rib and/or provide extra free space in the wing box. The void may have a height that is greater than a third (and possibly greater than a half) of the greatest height of the half rib in the region of the void. The void may have a height that is greater than a sixth (and possibly greater than a quarter) of the greatest height of the rib, formed of the two half ribs. The void is preferably so sized that it has a maximum dimension that is greater than 25 mm, more preferably greater than 50 mm. The maximum dimension may be greater than 75 mm.

There may of course additionally or alternatively be gaps or voids that are differently shaped, for example having a width greater than its height.

The wing box may include a wing system that passes through a void defined between the two half ribs. The wing system may for example comprise one or more conduits, in the form of pipes or connectors or cables for conveying resources or material for use by the aircraft, and a part of such a conduit may pass via the void. For example, the conduit may be in the form of a pipe for carrying hydraulic fluid or fuel or in the form of one or more electronic and/or fibre-optic cables.

The centre of the void may be separated from the neutral axis of the rib. The neutral axis of the rib may be deemed as that line along the rib when view in cross-section that is subjected to minimum shear during normal flight conditions. The neutral axis is typically near to and roughly aligned with a plane that is parallel to the chord of the wing and parallel to a notional horizontal line that is perpendicular to the longitudinal axis of the fuselage, the place bisecting the wing box.

There may be at least two projections shaped such that the overlapping portion defined by the two projections is separated from the neutral axis of the rib. In this case, the separation from the neutral axis is not a trivial or negligible, and is preferably greater than 5 mm and more preferably greater than 10 mm. In the case where the joining is effected by means of a fastener, the centre of the fastener is preferably separated from the neutral axis by more than 10 mm. Whilst joining the half ribs by means of one or more fasteners positioned near the neutral axis is structurally efficient, it has been found that moving the joining location away from the neutral axis can allow the design of the wing-box interior to be more adaptable. For example, in-wing systems may more readily be accommodated without needing to adapt the layout and/or shape of certain in-wing systems to fit in with the voids provided in the rib.

The wing box preferably comprises a multiplicity of pairs of half ribs, each pair being joined to form a rib extending from the upper wing skin to the lower wing skin. Thus, each half rib may comprise a base and a plurality of projections that extend away from the base, the projections defining a series of troughs and peaks. Also, the respective projections of the half rib of each pair may overlap with respective projections of the other half rib of the pair thereby defining overlapping portions, the half ribs of each pair being joined in the regions of the overlapping portions. There may for example, be four or more such pairs of half ribs. There may be six or more such pairs. Preferably, all of the ribs that provide support between the upper wing skin and the lower skin, or all except a minority of such ribs, in the wing box are defined by said multiplicity of pairs of half ribs (said minority accounting for no more than five ribs in the wing-box). Preferably, substantially all (i.e. all or all but one or two) of the ribs in the wing box that are formed of two half ribs joined so as to provide structural support in the wing-box are defined by said multiplicity of pairs of half ribs. Preferably, at least three-quarters (by mass, or more preferably by number) of all of the ribs in the wing box are defined by said multiplicity of pairs of half ribs. Thus, in certain embodiments of the invention, the provision of a multiplicity of pairs of half ribs is at the heart of the method and principle of construction of the wing-box; it is those ribs that provide the principal structural strength of the wing box. It will of course be appreciated that there may be other ribs in the wing box that do not contribute to the principal structural strength of the wing box, such as for example, one or more outboard ribs provided to give stiffness to the wing skin at or near the tip of the wing. Also, there may need to be ribs that are not defined by two half ribs joined together. For example, there may be ribs in the wing box that in use act as fuel tank boundaries; such ribs may be in the form of a single-piece rib extending from the lower wing skin to the upper wing skin.

The wing box may comprise two wing box halves, the first half including the upper wing skin and one half rib of each of said multiplicity of pairs of half ribs and the second half including the lower wing skin and the other half rib of each of said multiplicity of pairs of half ribs. In such a case the first wing box half is preferably joined to the second wing box half primarily by means of the joins in the regions of the overlapping portions defined between the two wing box halves.

The half ribs may be metal half ribs. The wing skins may be metal wing skins. It is possible for the ribs to be metallic and for the wing skins to be made of other material, for example composite material.

The half ribs and the wing skins may be made from composite material, for example a carbon fibre/resin matrix composite metal. The wing box may be a composite wing box.

At least one of upper and the lower wing skins may be integrally formed with the half ribs joined therewith. At least one of upper and the lower wing skins may be joined to the half ribs by means of bonding, welding or otherwise joining by a means that does not require the use of additional localised fasteners that pass between the base of the rib half and the wing skin; the provision of such fasteners may add significant weight to the wing.

At least one of the upper wing skin and the lower wing skin is preferably formed from a single one-piece panel. It is typical for wing covers of the prior art to be formed from three or more panels joined by means of butt straps and a multiplicity of additional localised fasteners. It will of course be appreciated that in this context the upper/lower wing skin refers to the structure that defines the upper/lower surface of the wing, except for additional pre-assembled components, such as leading edge and trailing edge structures, any wing tip, or wing mounted devices, or add-on fairings.

It will be appreciated that many of the features of the first aspect of the invention may have technical advantage or otherwise be of benefit when provided on an wing box in which the specific geometry of the projections differs, such that for example there are one or more projections which are not shaped such that the separation between the peak defined by the projection and the adjacent trough is greater than half the height of the half rib in the region of the projection or such that for example there are no projections on the half rib shaped in such a way.

According to a second aspect of the invention, there is provided an aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions, there is at least one projection shaped such that the separation between a trough adjacent to the projection and the nearest region of wing skin is less than a quarter of the separation between the peak defined by the projection and the nearest region of wing skin.

According to a third aspect of the invention, there is provided an aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions, there are at least two projections shaped such that the overlapping portion defined by the two projections is separated from the neutral axis of the rib.

According to a fourth aspect of the invention, there is provided an aircraft wing box, wherein the wing box comprises a multiplicity of pairs of half ribs, each pair being joined to form a rib extending from the upper wing skin to the lower wing skin, each half rib comprises a base and a plurality of projections that extend away from the base, the projections defining a series of troughs and peaks, respective projections of the half rib of each pair overlap with respective projections of the other half rib of the pair thereby defining overlapping portions, the half ribs of each pair being joined in the regions of the overlapping portions, and at least the majority of ribs in the wing box are ribs defined by said multiplicity of pairs of half ribs.

According to a fifth aspect of the invention, there is provided an aircraft wing box, wherein the wing box comprises a pair of half ribs (preferably metal) joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions. As mentioned above, the ribs, whilst preferably of metal, may instead be made from composite material.

According to a sixth aspect of the invention, there is provided an aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, and respective projections of one half rib overlap with respective projections of the other half rib thereby defining overlapping portions, the half ribs being joined in the regions of the overlapping portions by means of a fixing arrangement that enables the position of joining of the half ribs to be adapted during initial assembly of the half-ribs to accommodate relative movement of the half ribs in a direction substantially parallel to the plane of one of the half ribs.

For example, the fixing arrangement may be in the form of a hole in each overlapping portion through which a fastener is accommodated. The holes may be concentric holes, for example holes drilled during manufacture, for example during assembly. The fixing arrangement may further enable the position of joining of the half ribs to be changed, during assembly of the half-ribs, to accommodate relative movement of the half ribs in a direction substantially parallel to the plane of one of the half ribs. Thus, for example, the fixing arrangement may be arranged such that once fastened, the overlapping portions may be unfastened, moved relative to each other in a direction substantially parallel to the plane of one of the half ribs, and then refastened in a different relative position. In the case where the fixing arrangement comprises holes in the half ribs in which a fastener is accommodated, one hole may be larger than the cross-section of the fastener that passes therethrough, thereby allowing adjustability during assembly. The fixing arrangement may of course be in a form that facilitates the adjustment of the relative positions of the half ribs without the need to create holes in the overlapping portions during assembly.

The present invention also provides various related methods of manufacturing a wing box or a rib for such a wing box.

In accordance with a seventh aspect of the invention, there is provided a method of manufacturing a rib for a wing box, wherein the method comprises the steps of providing a first metal half rib comprising a base and a plurality of projections that extend away from the base, the projections defining a series of troughs and peaks, deforming the half rib so that the separation between the peaks of at least two of the projections is caused to reduce, and attaching the first half rib to a second half rib so as to define a rib.

The step of deforming the half rib may be performed by means of mechanically deforming and/or heat forming the half rib. Preferably, an age creep forming process is used. The method preferably includes a step of making a second, preferably metal, half rib. The second half rib may also comprise a base and a plurality of projections that extend away from the base, the projections defining a series of troughs and peaks. The step of making the second half rib including may include a step deforming the half rib so that the separation between the peaks of at least two of the projections is caused to reduce.

The step of attaching the first half rib to the second half rib is preferably performed by means of attaching the half ribs with fasteners. The or each half rib may conveniently comprise a base and may conveniently comprise a plurality of projections that extend away from that base, the projections defining a series of troughs and peaks. Respective projections of the half rib of each pair of half ribs may overlap with respective projections of the other half rib of the pair thereby defining overlapping portions. The method may include a step of fastening the half ribs of the or each pair with respective fasteners in the regions of the overlapping portions.

The step of providing the first metal half rib may comprise making first metal half rib. The method may for example comprise steps of extruding a section of metal and then cutting away material from the extruded section to form the plurality of projections. The extruded section is then deformed as set out above to form that half rib. The metal from which the section is extruded may be an alloy that has been processed to give the alloy certain properties. Alloys for use in the aerospace industry may be expensive to manufacture. Making ribs by using a section made by extruding such alloys may be more cost-effective, and less wasteful of material, than machining a solid rib from a large billet of alloy material. There may be performed a step of bending a flange on the half rib to form a stiffener on the half rib. For example, a preformed flap or tab on the extruded section may be folded over to provide extra strength in the rib.

The above method may be performed as past of a method of manufacturing a wing box. Thus, according to a eighth aspect there is provided a method of manufacturing a wing box, wherein the method comprises the steps of providing a first wing box half comprising a metal half rib having a base joined to a first wing skin, deforming the first wing box half so that the first wing skin adapts a desired aerodynamic profile and so that the rib deforms with the wing skin, attaching the first wing box half to a second wing box half so as to define a wing box.

The first and/or second wing box halves may each comprise a plurality of half ribs. The or each half rib of each wing box half may be paired with an opposite half rib of the other wing box. The method of the eighth aspect may of course utilise features of the method of the seventh aspect of the invention. For example, the method may include fastening fasteners. The fastening of the fasteners may be performed by means of accessing the interior of the wing box via the front and/or rear ends of the wing box (i.e. from the trailing and/or leading edges). The method of manufacture may be able to be automated, at least partially. For example, the fastening steps may be performed by an automatic fastening tool.

Whilst the metal half rib is stated to be "joined" to the wing skin it will be understood that it would not be outside the scope of this aspect of the invention for the metal half rib to be integrally formed with the wing skin.

In an embodiment of the eighth aspect of the invention, the forming of the half-rib with the wing skin is performed by means of age-creep forming. In that embodiment, there is a consequent ability to keep the outer wing-skin-line and hence the aerodynamic profile of the wing-skin maintained throughout wing box manufacture (i.e. the wing skin or "cover" no longer has to be separately formed to fit the substantially fixed and preset shape of the ribs).

According to a ninth aspect of the invention, there is provided a method of manufacturing a wing box, wherein the method comprises the steps of providing a first wing box half comprising a plurality of half ribs projecting from an upper wing skin, providing a second wing box half comprising a plurality of half ribs projecting from an lower wing skin, bringing the first and second wing box halves into alignment with each other in accordance with a design model concerning the relative positioning of the upper and lower wing skins, and then fastening the half ribs of the first wing box to the half ribs of the second wing box, whilst maintaining the alignment of the first and second wing box halves, wherein the step of fastening of the half ribs of the first wing box to the half ribs of the second wing box is the first step of forming the structural join between the wing box halves.

Temporary joins, not forming the structural joins may of course also be made, to assist the maintenance of the correct alignment of the first and second wing box halves. The step of fastening of the half ribs of the first wing box to the half ribs of the second wing box may be performed substantially immediately after bringing the two wing box halves into alignment.

The step of fastening of the half ribs of the first wing box to the half ribs of the second wing box may form the primary structural means of joining the two wing box halves The step of bringing the first and second wing box halves into alignment may include a sub-step of adjusting the relative position of one half rib relative to another half rib, by means of movement that causes part of one half rib to slide against a part of the other half rib. The sliding parts may be defined by projections extending from the base of the respective half ribs.

The first and second wing box halves may first be brought into approximate alignment. The method may then include adjusting the relative position of the first and second wing box halves by means of a movement substantially parallel to the plane of one of the half ribs (i.e. movement in a direction parallel to the plane of the rib web of the half rib).

Before bringing the first and second wing box halves into alignment with each other, there may be a step of mounting one or more in-wing systems, or parts thereof, in at least one of the first and second wing box halves.

The step of providing the first wing box half may include deforming the first wing box half so that the upper wing skin adapts a desired aerodynamic profile and so that the rib deforms with the wing skin.

According to a tenth aspect of the invention, there is provided a method of manufacturing a wing box, wherein the method comprises the steps of providing a first wing box half comprising a plurality of half ribs projecting from an upper wing skin, providing a second wing box half comprising a plurality of half ribs projecting from a lower wing skin, mounting a plurality of in-wing systems in at least one of the first and second wing box halves, then fastening the first wing box half to the second wing box half.

The majority, by number, volume and/or by mass, of the in-wing systems may be so mounted before wing box halves joined.

The invention also provides methods of designing a wing box, for example a wing box according to any other aspect of the invention.

According to a eleventh aspect of the invention, there is provided a method of designing a wing box, wherein the method comprises the steps of designing an aerodynamic profile to be defined by upper and lower wing skins, designing the layout of systems in the wing, designing the shape of a first wing box half comprising a plurality of half ribs projecting from an upper wing skin, designing the shape of a second wing box half comprising a plurality of half ribs projecting from a lower wing skin, the first and second wing box shapes so designed including voids between the half ribs to accommodate parts of the in wing systems, and producing a design model embodying the design of the wing box, the design model being based on the aerodynamic profile, the layout of systems in the wing, and the shape of the first and second wing box halves as designed in the aforementioned steps. The design model may be in electronic form. The design model may, for example, be in the form of computer readable electronic media.

According to a twelfth aspect of the invention, there is provided a method of method of manufacturing a wing box, wherein the method includes a step of designing a wing box to produce a design model embodying the design of the wing box to be made by performing the method of the eleventh aspect of the invention, and a step of making the wing box in accordance with the design model. The step of making the wing box in accordance with the design model may use any of the method steps described above in relation to other aspects of the invention.

The present invention also provides a half rib for use in any other aspect of the invention.

The present invention also provides an aircraft including a wing box according to any aspect of the invention.

There is further provided a method of manufacturing an aircraft including a wing box, wherein the method includes the steps of providing an aircraft fuselage, manufacturing a wing box by performing a method according to any aspect of the invention, and joining the wing box and the fuselage.

It will of course be appreciated that features of aspects of the invention relating to the wing box and rib therefore may be incorporated into aspects of the invention relating to the method of manufacture and vice versa. Thus for example, the wing box of any aspect of the present invention may possess features that would result from the performance of a method according to any aspect of the invention. Also, a method according to any aspect of the invention may be performed in such a way as to result in the manufacture of a wing box possessing features of a wing box according to any aspect of the invention.

It will be appreciated that the word "half" used in relation to half rib and wing box half does not necessarily mean that the rib, or wing box is exactly dividing into two equal and opposite parts. The word "half" is simply used as a convenient label for two of the major component parts of a larger whole.

Whilst the present invention has been described in part in relation to a wing box, the skilled person will readily appreciate that in the context of the present invention, the wing box need not form a part of the main wings of an aircraft. The wing box could for example form part of the tail plane of an aircraft. The wing box could form part of define any other aerofoil box.

DESCRIPTION OF THE DRAWINGS

Embodiments of the present invention will now be described by way of example only with reference to the accompanying drawings of which.

DETAILED DESCRIPTION

Figure 2A:
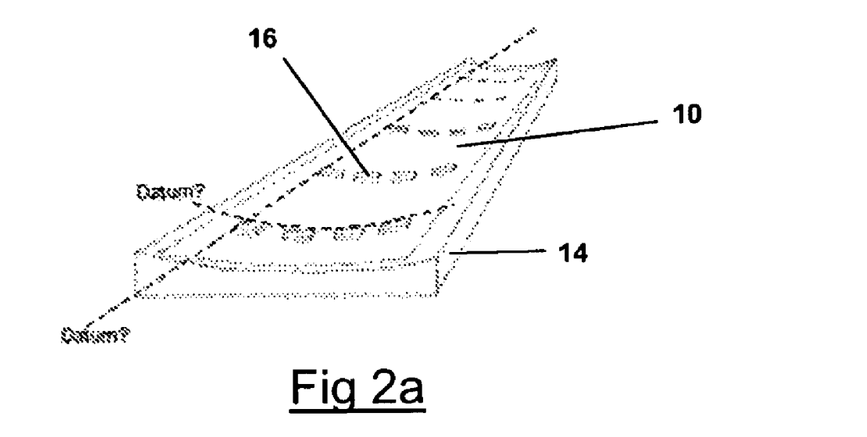
FIGS. 2a to 2f show the steps of a method of producing a wing box according to a first embodiment of the invention.

A method of manufacturing an aircraft wing box in accordance with a first embodiment of the invention is illustrated by FIGS. 2a to 2f. FIG. 2a shows an uncured composite lower wing skin 10 that has been laid up on a forming plate 14. The wing skin 10 includes rib lands 16 for receiving half ribs (not shown in FIG. 2a). Castellated composite half ribs 18 and stringers 22 are laid on top of the wing skin via adhesive film (not shown in FIG. 2b). Additionally, an outboard crescent rib 24 is mounted at the outboard (tip end) end of the wing skin 10a and a spar cap 26 is provided terminating 26a at a location set back from the outboard end 10a of the wing skin. The components mounted on the wing skin 10 are then permanently secured to the wing skin by curing the adhesive film in an autoclave in accordance with standard techniques.

Figure 2B:
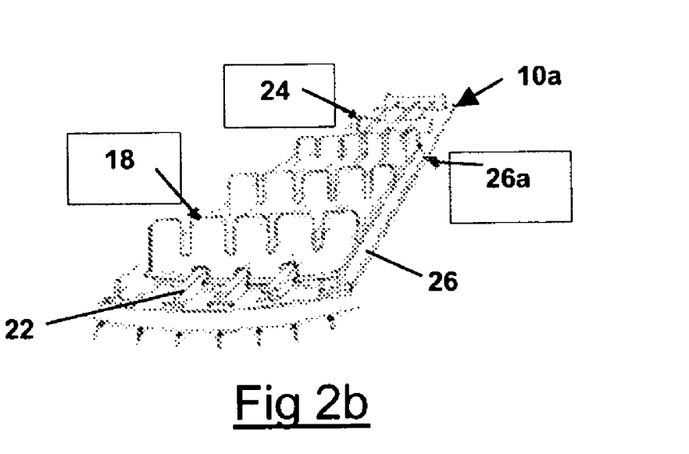
Figure 2C:
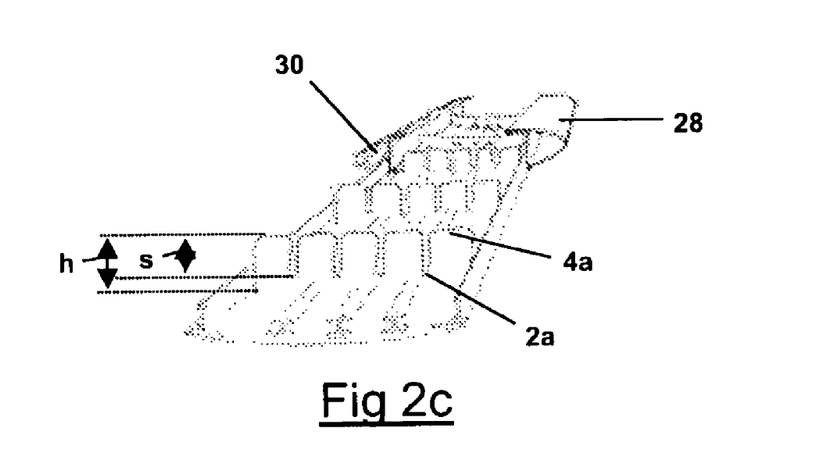
Figure 2D:
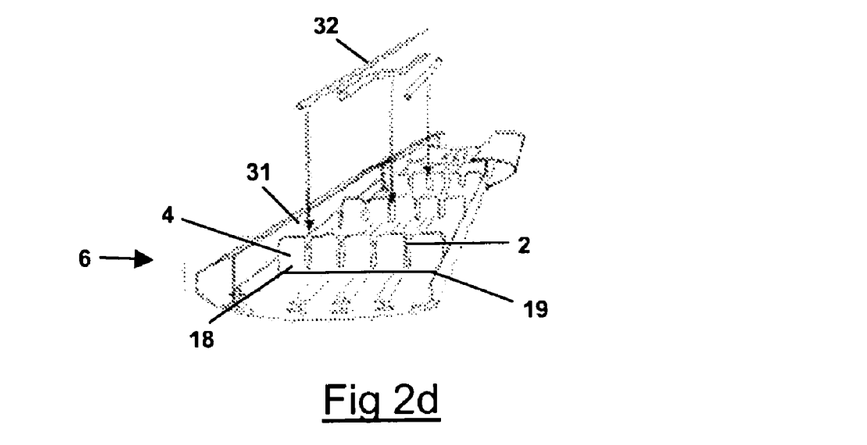

FIG. 2c illustrates a step of attaching integral modular outer leading and trailing edge structures 28, 30. Next, as illustrated by FIG. 2d, in-wing systems are inserted and attached inside the lower wing box half 6, such systems including fuel pipes 32 for hydraulic and fuel systems and the like. Such pipes 32 are accommodated in gaps 2 between projections 4 of the half rib 18 (thus, the half rib 18 has peaks and troughs along its length defined by the projections 4 and gaps 2, respectively).

The inboard trailing edge structure 31 is then fastened to the trailing edge of the wing box half 6. An upper wing box half 5 comprising upper half ribs 20 attached to an upper wing skin 12 is constructed in a similar manner to that described above (save that no additional leading edge and trailing edge structures are added). The upper wing box half 5 is brought into approximate alignment with the lower wing box half 6, so that the projections 4 of the lower half ribs 18 overlap with the projections of the upper rib halves 20. These overlapping portions 3 are brought into sliding engagement. The desired aerodynamic profile of the wing box (having been predetermined) is then achieved by means of fine adjustment of the relative positions of the upper and lower wing box halves 5, 6. The relative position of the first and second wing box halves is adjusted by means of movement parallel to the plane of the web of any of the ribs. Such movement allows ready adjustment and correction of the relative positions of the wing boxes to provide the correct aerodynamic profile of the wing box.

Figure 2E:
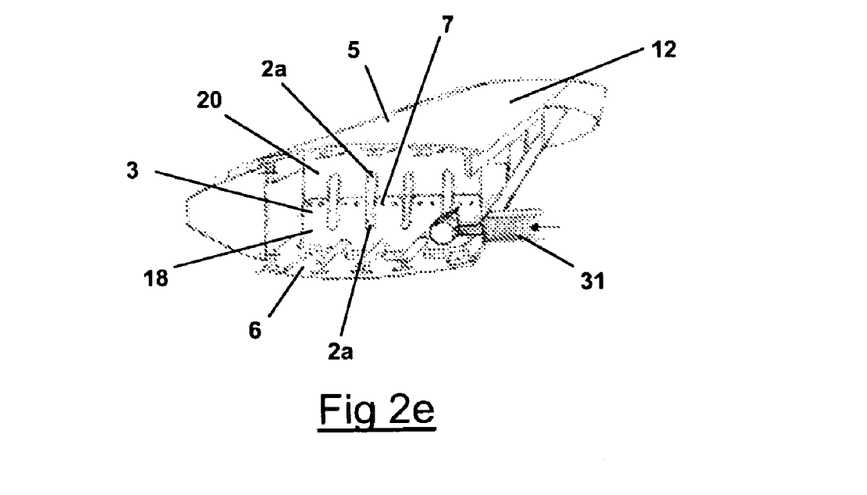

Once the two halves 5, 6 have been correctly aligned (the alignment for example being ascertained by means of a computer controlled metrology system of a type standard in the art or alternatively by means of manual measurements of the aerodynamic profile of the wing box), the position is held and the half ribs are joined to each other by means of fasteners 7 that join the overlapping portions 3 between the half ribs 18, 20, as illustrated in FIG. 2e. The fastening of the castellated half ribs is achieved by means of a automatic fastening tool 34 that drills a hole, and inserts and fastens a fastener 7 at each location where a fastener is required (in the first embodiment, there being two fasteners 7 per each projection 4).

Figure 2F:
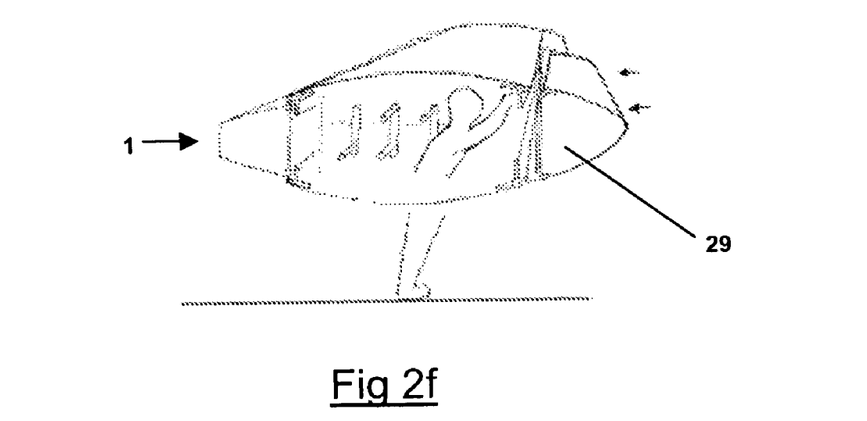

The inboard leading edge 29 is then manually attached to close the completed wing box 1, as shown in FIG. 2f. Thus the completed wing box 1 comprises a pair of half ribs 18, 20 (as well as other half ribs) joined to form a rib extending from an upper wing skin 12 to a lower wing skin 10. Each half rib 18 comprises a base 19 from which the projections 4 extend (see for example FIG. 2d). As can be seen in FIGS. 2a to 2f each projection 4 is shaped such that the gap 2 measured in a direction h parallel to the height of the rib (formed by the two half ribs 18, 20), between the peak 4a defined by the projection and the adjacent trough 2a is greater than half the height of the half rib in the region of the projection 4 (see FIG. 2c). It will also be seen that in the complete wing box when fastened together (see FIG. 2e) the height of each gap 2 (i.e. the separation of the troughs 2a defining the gap) measured in a direction parallel to the height h of the rib, is significantly greater than the greatest width w (not labelled in FIGS. 2a to 2e) of the void. The height of the gaps 2 as shown in FIG. 2e is at least four times greater than their width.

FIGS. 2b to 2d show four castellated half ribs and one crescent rib (without castellations). Therefore, the castellated half ribs form the majority of the ribs in the wing box. The structural join between the two wing box halves 5, 6 is primarily formed by means of the fasteners 7 joining the overlapping portions 3 between the half ribs 18, 20 of each pair of half ribs that are joined (one half rib of each pair being attached to the upper wing skin and the other half rib of each pair being attached to the lower wing skin).

In the completed wing box, the upper wing cover of the wing box (i.e. the cover excluding the regions defined by the leading edge and trailing edge structures) is defined by a single one piece panel provided by the lower wing skin 10. Similarly, the lower cover is formed by the one piece upper wing skin 12.

Figure 3A:
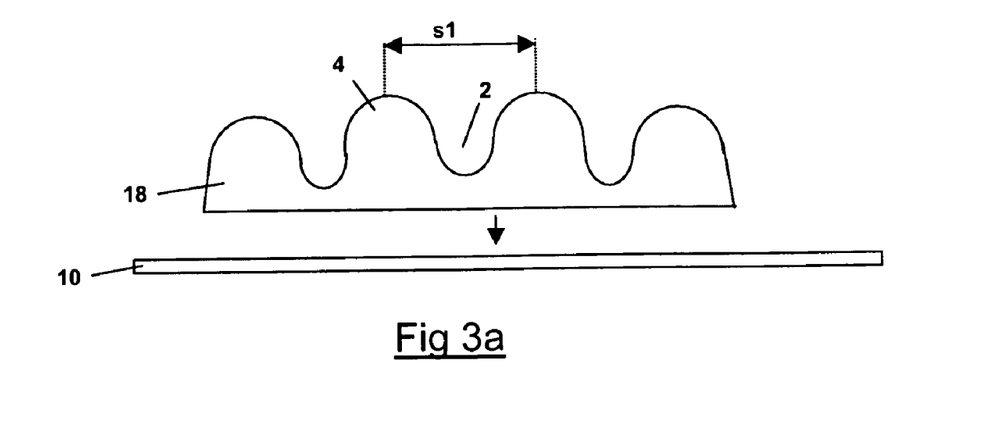
FIGS. 3a to 3f show the steps of a method of making a wing box according to a second embodiment of the invention.
Figure 3B:
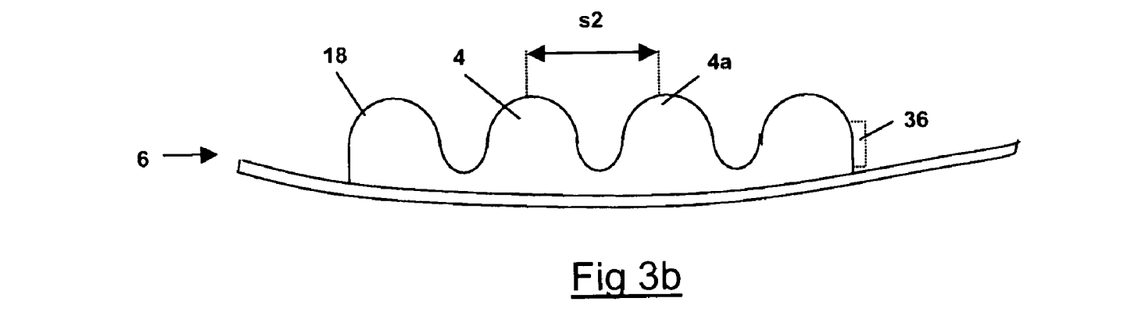
Figure 3C:
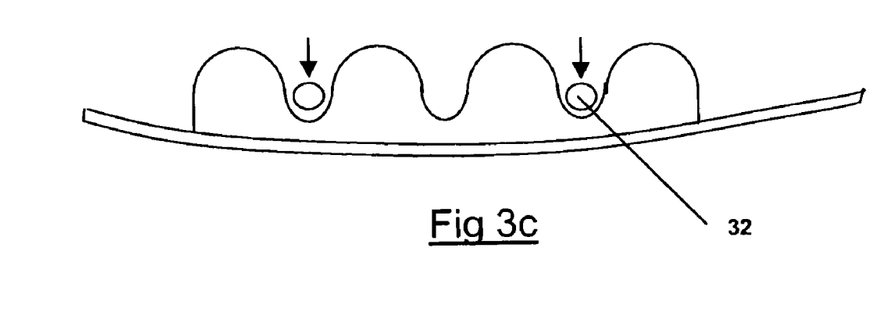
Figure 3D:
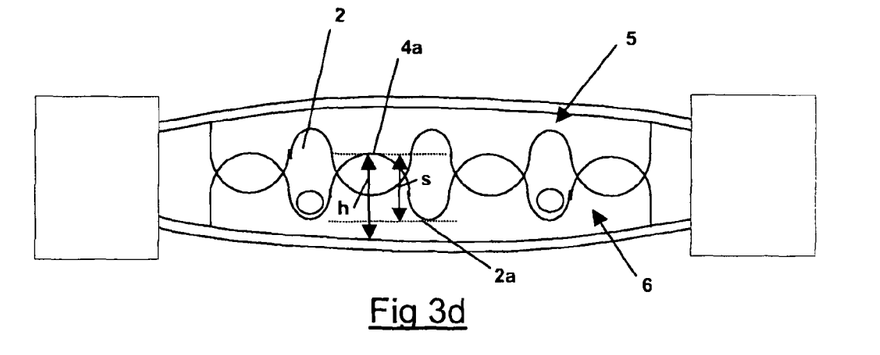
Figure 3E:
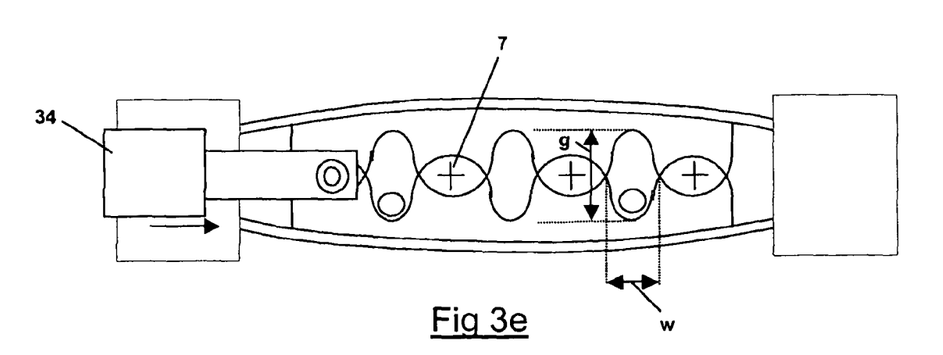
Figure 3F:
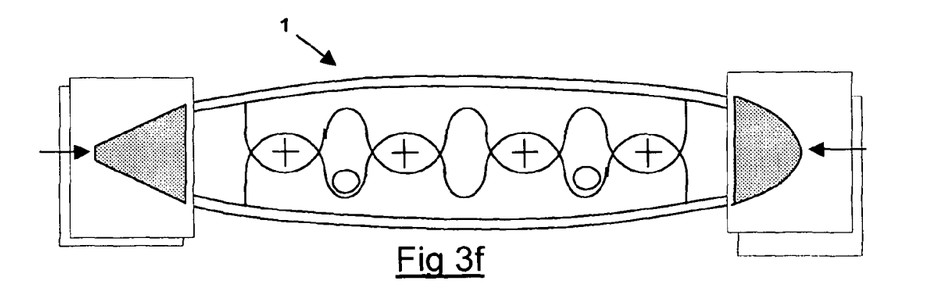

FIGS. 3a to 3f illustrate a method of manufacturing a wing box according to a second embodiment of the invention. The wing box of the second embodiment of the invention is similar in structure to the first embodiment. The steps of the method illustrated by FIGS. 3a to 3f are substantially similar to the corresponding steps of the method illustrated by FIGS. 2a to 2f respectively. Thus, a castellated half rib and wing skin is provided into which in-wing systems are mounted and attached (see FIGS. 3a to 3c). Thereafter two wing box halves are brought into alignment and then fastened to each other by means of fasteners connecting overlapping portions of the half ribs and trailing edge and leading edge structures are attached (FIGS. 3d to 3f). FIGS. 3a to 3f will now been described in further detail so that the principal differences between the first and second embodiments can be described.

In FIG. 3a there is shown a metal half rib 18 being attached to a lower wing skin 10. The rib half has been produced by means of extruding a section of aluminium lithium alloy (a alloy composition known to aerospace engineers) to produce a section having the shape of an inverted T. Projections 4 are then machined by removing material (thereby forming gaps 2). It will be noted that the two inner projections have a height slightly greater than the outer two projections 4 as shown in FIG. 3a. It will also be noted that the lower metal wing skin 10 is substantially flat in shape. The lower rib half 18 is attached to the wing skin 10 by means of fusion welding.

The wing skin 10 and half rib 18, thereby defining in part a lower wing box half 6, are then age-creep formed so as to cause the lower wing skin to adapt the pre-defined aerodynamic outer skin profile. Thus, by deforming the half rib 18, during the age-creep forming process, the projections 4 are caused to move from the position shown in FIG. 3a to the position shown in FIG. 3b so that the separation between the peaks of the projections is caused to reduce (from S1 to S2). It will be seen that after the age-creep forming step that all peaks 4a of the projections 4 are approximately in line with each other (in the horizontal plane). An upper wing box half (not shown in FIGS. 3a to 3c) is similarly produced.

The upper and lower wing box halves 5, 6 are then brought into alignment, as shown in FIG. 3d, and then a fastener tool 34 is used to automatically fasten the rib halves together to connect the box. Immediately before fastening tolerances are taken up so that there need be no significant comprise of the outer aerodynamic profile. Lastly, as shown in FIG. 3f the remaining leading and trailing edge and spar assemblies are attached to the wing box 1.

Whilst the drawings of FIGS. 3a and 3f are schematic, the gaps 2 defined between the half ribs 18, 20 are relatively wide compared to the equivalent gaps of the first embodiment. The gaps 2 and shapes of the half ribs are such that the separation s of the peak 4a defined by a projection 4 and the adjacent trough 2a is greater than half the height h of the half rib in the region of the projection 4 (see FIG. 3d). Also, whilst wider than the equivalent gaps shown in FIGS. 2a to 2f, the gaps 2 shown in FIGS. 3a to 3f have a height g greater than their greatest width w.

In a modification of the second embodiment (not separately illustrated), the extruded section of half rib is strengthened by means of bending a tab portion that extends along a side of a projection 4. The position and shape of such a tab 36 is shown in broken line in FIG. 3b (in its unbent position). The tab is bent through an angle of about 90 degrees to provide a flange that acts as a vertical stiffening member. Further tabs could be added, for example one tab per projection 4 or even so that each projection has one tab either side. Such a tab portion/flange could of course be included in the half rib as illustrated by the other accompanying drawings.

Figure 4:
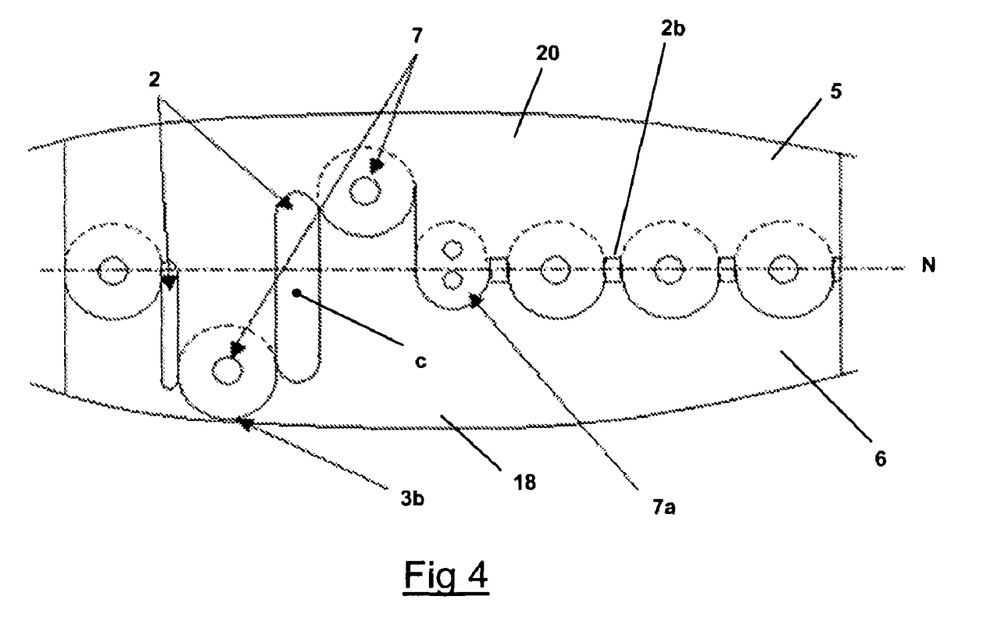
FIG. 4 shows a cross-section of a wing box according to a third embodiment of the present invention.

FIG. 4 shows a wing rib in cross-section manufactured in accordance with a third embodiment of the present invention. It will be seen that the fasteners 7 connecting the upper and lower half ribs 5, 6 are vertically eccentric in location, in that some fasteners 7 are aligned with the neutral axis n whereas others are separated from the neutral axis. Thus, the overlapping portions 3 defined by certain pairs of projections 4 are separated from the neutral axis n of the rib. In the rib illustrated by FIG. 4, the overlapping portions 3 are defined circular shaped (the shape of the parts of the lower rib 6 hidden by the overlapping portions of the upper rib being shown in broken line in FIG. 4. It will also be seen from FIG. 4 that the centre of each of at least two of the gaps 2 defined between the upper and lower half ribs 5, 6 is also separated from the neutral axis n (for example, note the position of the centre of the largest gap 2 shown in FIG. 4, which is clearly displaced from the neutral axis n).

The lowest of the overlapping portions shown in FIG. 4, overlapping portion 3b, is positioned such that the lowest point of the overlapping portion 3b is set clear of the lower wing skin 10 (not separately shown) and clear of the base of the lower half rib 6, without requiring a different shape of overlap. The typically dimension of the circular shaped overlapping portion 3 is a 30 mm diameter and the projections 4 are shaped to allow for up to +/−5 mm tolerance between the upper and lower wing box halves 5, 6 on assembly. At least some of the fasteners 7 shown in FIG. 4 are separated from the neutral axis by a distance significantly greater than the tolerance distance (typically of the order of the +/−5 mm—i.e. up to 10 mm in total) that might be obtained as a result of build of tolerances in components during manufacture and assembly.

FIG. 4 also shows that the size and arrangement of the gaps 2 defined between adjacent sections of the rib halves 18, 20 can vary considerably. The gaps can be designed to accommodate in-wing systems. Moreover, during design of the wing box, there may be provided greater flexibility for the positioning of in-wing systems as there may be provided greater flexibility in the positioning of the voids defined by the gaps 2 between the rib halves 18, 20. Such a design process would include setting the desired aerodynamic profile to be defined by the upper and lower wing skin surfaces and then designing the layout of in-wing systems in the wing locks and then designing the shape of the wing box halves and their respective half ribs. Thus the half ribs may be so designed so as to define voids in the assembled wing box, such voids accommodating parts of the in-wing systems. Once the design work is completed which may require several iterations of redesigning the layout of the in-wing systems and redesigning the shape of the half ribs, a design model may be produced representing an aerodynamic profile of the wing box as defined by the upper and lower wing skin surfaces and the shapes of the half ribs. The design model may additionally include schematic layout of the in-wing systems for reference during assembly.

Certain voids 2b are relatively small and are provided as lightening pockets, not necessarily accommodating any in-wing systems. The gaps 2b are relatively narrow in width as a result of the need for sufficient overlap area between the projections of the upper and lower half ribs 18, 20 to allow the fasteners to join portions that are sufficiently structurally strong. The horizontal width of the gaps 2 that accommodate in-wing systems may have a typically minimum width of 10 mm but are more typically about 75 mm wide. A typical height of a gap 2 might be of the order of 300 mm. For example, the largest gap 2 shown in FIG. 4 has a width of 75 mm and a height of 300 mm. It will also be noted that in FIG. 4 one of the overlapping portions is fastened by means of two fasteners 7. The double fastening is provided in this case because the overlapping portion is narrower than it is tall (the shape of the overlapping portion in this instance being oval as opposed to circular). The oval arrangement coupled together with the next overlapping portion to the left being disposed above the mutual axis but at a horizontal position directly adjacent to the double fastened overlapping portion, allows the largest void 2 to be as wide as it is.

It will of course be appreciated that the rib illustrated by FIG. 4 may form part of a fully assembled wing box. Also, the wing boxes illustrated by the accompanying drawings may form the part of a complete assembled wing, which may in turn form part of a complete assembled aircraft.

Figure 5A:
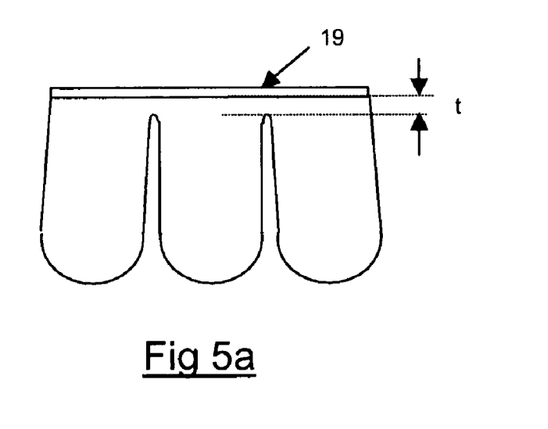
FIGS. 5a and 5b show partial cross-sectional views of a half rib being made in accordance with a fourth embodiment of the invention.
Figure 5B:
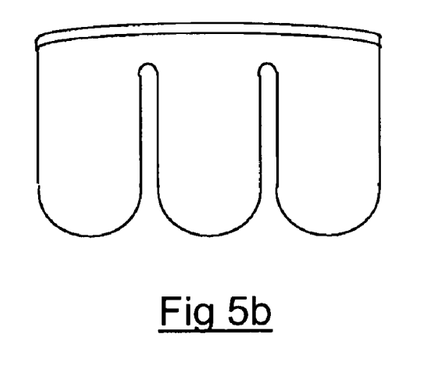

FIGS. 5a and 5b show in cross-section part of a half rib of a fourth embodiment of the invention (an upper half rib). FIG. 5a shows an extruded half rib section, extruded from Aluminium alloy, before age creep-forming. The rib after age creep-forming is shown in FIG. 5b. The feature of interest shown in FIGS. 5a and 5b is the distance t between the bottom of the trough and the nearest section of the base 19 of the rib. This distance is very short in comparison to the height of the half rib. Moreover, the separation between the trough and the nearest region of upper wing skin is significantly less than a quarter of the separation between the peak defined by the adjacent projection and the nearest region of upper wing skin.

Figure 6:
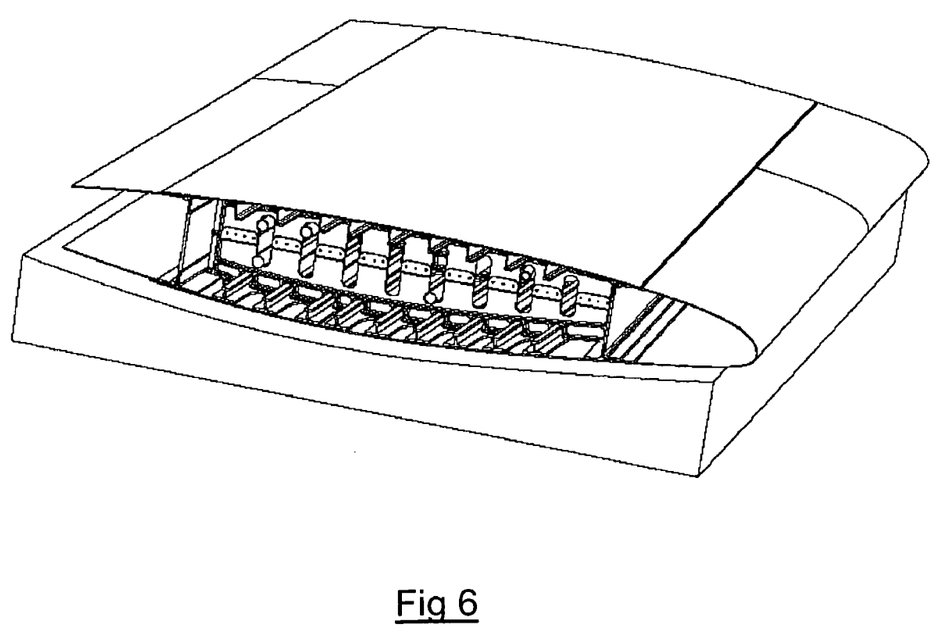
FIG. 6 shows a wing box according to a fifth embodiment of the invention.

FIG. 6 shows a wing box according to a fifth embodiment of the invention, wherein the half rib visible in the drawing has castellations defining eight troughs. The wing box is shown during the last stages of assembly, whilst still mounted on the moulding tool. The manufacturing and assembly of the wing box of the fifth embodiment is identical to that described above in relation to the first embodiment, the principle differences between the embodiments residing in the particular shape and construction of the wing box.

Whilst the present invention has been described and illustrated with reference to particular embodiments, it will be appreciated by those of ordinary skill in the art that the invention lends itself to many different variations not specifically illustrated herein.

For example, different shapes of projections may be utilised. Different materials may be used.

The wing box shown in FIGS. 2a to 2f comprises five ribs. Of course, the embodiment of FIGS. 2a to 2f may be adapted for use on larger or smaller aircraft. One variant of the embodiment relates to an aircraft having a total wing span of about 30 m, there being twenty-eight ribs in each wing. The biggest inboard rib has a length of about 2.1 m and a total height of about 0.5 m. The voids in this rib have a height of about 0.4 m and a width of about 0.1 m and are positioned midway between the upper and lower wing skins. The castellated rib that is most outboard has a length of about 1.0 m and a height of about 0.3 m. The voids in this rib have a height of about 0.2 m and are also positioned midway between the upper and lower wing skins. In each wing there are twenty ribs formed from castellated half ribs (i.e. more than three-quarters of the number of ribs that provide support between the lower wing skin and the upper wing skin), three solid ribs for forming wing fuel tank boundaries (including the closing rib at the outermost tip of the wing box) and five crescent ribs (without castellations) positioned at the outer end of the wing box (see FIG. 2b for a representation of a crescent rib). The crescent ribs each have a length of about 0.6 m. The separation of the upper and lower wing skins in the region of the crescent ribs is about 0.2 m.

On an aircraft having a wing span of say 60 m, the rib length at the root of the wing box might be about 5.3 m with a height of about 0.7 m. In such a case the voids in the rib would have a height of about 0.5 m (that is about three quarters of the height of the rib). In each wing of such an aircraft there are thirty-nine ribs, of which: five are solid ribs defining tank boundaries, three are crescent ribs and the remaining thirty-one are formed from castellated half-ribs. Thus, over three-quarter of the number of ribs in the wing are defined by castellated half-ribs.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Steps of method claims need not be performed in the order set forth, and need not be performed sequentially, unless the context dictates otherwise.

The invention claimed is:

1. An aircraft wing box, wherein
   the wing box comprises a pair of half ribs joined to form a rib extending from an upper wing skin to a lower wing skin,
   each half rib comprises a base and a plurality of projections that extend away from the base, the projections defining a series of troughs and peaks,
   respective projections of one half rib overlap with respective projections of the other half rib thereby defining overlapping portions, the half ribs being joined in the regions of the overlapping portions,
   there is at least one projection shaped such that the separation, measured in a direction parallel to the height of the rib, between the peak defined by the projection and the adjacent trough is greater than half the height of the half rib in the region of the projection,
   the half ribs are so arranged that a void is defined in the space between two adjacent projections and a trough on one half rib and the opposite two adjacent projections and one trough on the other half rib, and
   the void has a height and a width, the height being the maximum separation of the troughs defining the void, measured in a direction parallel to the height of the rib, the width being the maximum separation of the projections defining the void, measured in a direction perpendicular to the height of the void, such that the height of the void is greater than the width of the void.

2. An aircraft wing box according to claim 1, wherein there is at least one projection shaped such that the separation between a trough adjacent to the projection and the nearest region of wing skin is less than a quarter of the separation between the peak defined by the projection and the nearest region of wing skin.

3. A half rib for use in the aircraft wing box according to claim 1.

4. An aircraft wing box according to claim 1, wherein the wing box includes a wing system that passes through the void.

5. An aircraft wing box according to claim 1, wherein the centre of the void is separated from the neutral axis of the rib.

6. An aircraft wing box according to claim 1, wherein there are at least two projections shaped such that the overlapping portion defined by the two projections is separated from the neutral axis of the rib.

7. An aircraft wing box according to claim 1, wherein
   the wing box comprises a multiplicity of pairs of half ribs, each pair being joined to form a rib extending from the upper wing skin to the lower wing skin,
   each half rib comprises a base and a plurality of projections that extend away from the base, the projections defining a series of troughs and peaks,
   respective projections of the half rib of each pair overlap with respective projections of the other half rib of the pair thereby defining overlapping portions, the half ribs of each pair being joined in the regions of the overlapping portions.

8. An aircraft wing box according to claim 7, wherein at least the majority of ribs in the wing box are ribs defined by said multiplicity of pairs of half ribs.

9. An aircraft wing box according to claim 7, wherein the wing box comprise two wing box halves, the first half including the upper wing skin and one half rib of each of said multiplicity of pairs of half ribs and the second half including the lower wing skin and the other half rib of each of said multiplicity of pairs of half ribs, and the first wing box half is joined to the second wing box half primarily by means of the joins in the regions of the overlapping portions defined between the two wing box halves.

10. An aircraft wing box according to claim 1, wherein the half ribs are metal half ribs.

11. An aircraft wing box according to claim 1, wherein the upper wing skin and lower wing skin are metal wing skins.

12. An aircraft wing box according to claim 1, wherein at least one of the upper wing skin and the lower wing skin is formed from a single one-piece panel.

13. An aircraft including a wing box according to claim 1.

14. A method of manufacturing a wing box, wherein the method comprises the steps of
   providing a first wing box half comprising a plurality of half ribs projecting from an upper wing skin,
   providing a second wing box half comprising a plurality of half ribs projecting from a lower wing skin, each of said pluralities of half ribs comprising a base and a plurality of projections that extend away from the base, the projections defining a series of a plurality of troughs and a plurality of peaks,
   bringing the first and second wing box halves into alignment with each other in accordance with a design model concerning the relative positioning of the upper and lower wing skins, so that respective projections of each such half rib of the first wing box half overlap with respective projections of each corresponding half rib of the second wing box half, thereby defining a multiplicity of overlapping portions, and
   fastening, with a respective fastener at each of the multiplicity of overlapping portions, the half ribs of the first wing box to the half ribs of the second wing box so that the fastening of the half ribs defines and maintains the alignment of the first and second wing box halves such that the resulting aerodynamic profile of the wing box formed thereby conforms with said design model.

15. A method according to claim 14, wherein the step of fastening of the half ribs of the first wing box half to the half ribs of the second wing box half is the first step of forming the structural join between the wing box halves performed after bringing the two wing box halves into alignment.

16. A method according to claim 14, wherein the step of fastening of the half ribs of the first wing box half to the half ribs of the second wing box half, with the respective fasteners at the multiplicity of overlapping portions, forms the primary structural means of joining the two wing box halves.

17. A method according to claim 14, wherein the step of bringing the first and second wing box halves into alignment includes a sub-step of adjusting the relative position of one half rib relative to another half rib, by means of movement that causes part of one half rib to slide against a part of the other half rib.

18. A method according to claim 14, wherein the step of bringing the first and second wing box halves into alignment includes the sub-steps of bringing the first and second wing box halves into approximate alignment, then adjusting the relative position of the first and second wing box halves by means of a movement substantially parallel to the plane of one of the half ribs.

19. A method according to claim 14, including a step, performed before bringing the first and second wing box halves into alignment with each other, of mounting a plurality of in-wing systems in at least one of the first and second wing box halves.

20. A method according to claim 14, wherein the step of providing the first wing box half includes deforming the first wing box half so that the upper wing skin adapts a desired aerodynamic profile and so that the rib deforms with the wing skin.

21. A method according to claim 14, wherein the step of providing the first wing box half comprises the sub-steps of extruding a section of metal and then cutting away material from the extruded section to form the plurality of projections.

22. A method according to claim 14, wherein the step of providing the first wing box half comprises a sub-step of bending a flange on a half rib to form a stiffener on the half rib.

23. A method of manufacturing a wing box, wherein the method comprises the steps of
providing a first wing box half comprising a metal half rib having a base joined to a first wing skin, the half rib comprising a base and a plurality of projections that extend away from the base, the projections defining a series of troughs and peaks,
deforming the first wing box half so that the first wing skin adapts a desired aerodynamic profile and so that the rib deforms with the wing skin, and
attaching the first wing box half to a second wing box half so as to define a wing box.

24. A method according to claim 23, wherein the step of providing the first wing box half comprises a sub-step of bending a flange on a half rib to form a stiffener on the half rib.

25. A method according to claim 23, wherein the step of providing the first wing box half comprises the sub-steps of extruding a section of metal and then cutting away material from the extruded section to form the plurality of projections.

26. A method according to claim 23, wherein the second wing box comprises a metal half rib and each half rib of each wing box half comprises a base and a plurality of projections that extend away from the base, the projections defining a series of troughs and peaks, and is paired with an opposite half rib of the other wing box, respective projections of the half rib of each pair of half ribs overlap with respective projections of the other half rib of the pair thereby defining overlapping portions, there being at least one projection shaped such that the separation between a trough adjacent to the projection and the nearest region of wing skin is less than a quarter of the separation between the peak defined by the projection and the nearest region of wing skin, the method includes a step of fastening the half ribs of each pair with respective fasteners in the regions of the overlapping portions.

27. A method of manufacturing an aircraft including a wing box, wherein the method includes the steps of
providing an aircraft fuselage,
manufacturing a wing box by performing a method according to claim 14, and
joining the wing box and the fuselage.

28. A method of manufacturing a rib for a wing box, wherein the method comprises the steps of
providing a first metal half rib comprising a base and a plurality of projections that extend away from the base, the projections defining a series of troughs and peaks, the base having a surface for abutting a wing skin, there being at least one projection shaped such that the separation between a trough adjacent to the projection and said surface for abutting a wing skin is less than a quarter of the separation between the peak defined by the projection and surface for abutting a wing skin,
deforming the half rib so that the separation between the peaks of at least two of the projections is caused to reduce, and
attaching the first half rib to a second half rib so as to define a rib.

29. A method of manufacturing a wing box, wherein the method comprises the steps of
providing a first wing box half comprising a plurality of half ribs projecting from an upper wing skin,
providing a second wing box half comprising a plurality of half ribs projecting from an lower wing skin,
each half rib of the first and second first wing box halves comprising a base and a plurality of projections that extend away from the base,
mounting a plurality of in-wing systems in at least one of the first and second wing box halves, and
then fastening the first wing box half to the second wing box half, the projections on the half ribs defining a series of troughs and peaks, wherein respective projections of each half rib on the first wing box half overlap with respective projections of a corresponding half rib on the second wing box half rib thereby defining overlapping portions, the first wing box half is fastened to the second wing box half by means of fastening the overlapping portions together, and the half ribs of the wing box halves are so arranged that a void is defined in the space between (a) two adjacent projections and a trough on a half rib of the first wing box half and (b) the opposite two adjacent projections and one trough of the corresponding half rib of on the second wing box half other half rib, the void accommodating at least part of the in-wing systems.

30. A method of designing a wing box, wherein the method comprises the steps of:
designing an aerodynamic profile to be defined by upper and lower wing skins,
designing the layout of systems in the wing box,
designing the shape of a first wing box half comprising a plurality of half ribs projecting from an upper wing skin,
designing the shape of a second wing box half comprising a plurality of half ribs projecting from an lower wing skin, each half rib of the first and second first wing box halves comprising a base and a plurality of projections that extend away from the base, the projections on the half ribs defining a series of troughs and peaks,
the first and second wing box shapes so designed including voids between the half ribs to accommodate parts of the in wing systems, each such void being defined by a space between (a) two adjacent projections and a trough on a half rib of the first wing box half and (b) the opposite two adjacent projections and one trough of the corresponding half rib of on the second wing box half other half, the first and second wing box shapes so designed also being such that respective projections of each half rib on the first wing box half overlap with respective projections of a corresponding half rib on the second wing box half rib thereby defining overlapping portions for allowing the first wing box half to be fastened to the second wing box half, and producing a design model embodying the design of the wing box, the design model being based on the aerodynamic profile, the layout of systems in the wing, and the shape of the first and second wing box halves as designed in the aforementioned steps.

31. A method of manufacturing a wing box, wherein the method includes a step of designing a wing box to produce a design model embodying the design of the wing box to be made by performing the method of claim 30, and a step of making the wing box in accordance with the design model.

32. An aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions, there is at least one projection shaped such that the separation between a trough adjacent to the projection and the nearest region of wing skin is less than a quarter of the separation between the peak defined by the projection and the nearest region of wing skin, the half ribs are so arranged that a void is defined in the space between two adjacent projections and a trough on one half rib and the opposite two adjacent projections and one trough on the other half rib, and the void has a height and a width, the height being the maximum separation of the troughs defining the void, measured in a direction parallel to the height of the rib, the width being the maximum separation of the projections defining the void, measured in a direction perpendicular to the height of the void, such that the height of the void is greater than the width of the void.

33. An aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, respective projections of one half rib overlap with respective projections of the other half rib thereby defining overlapping portions, the half ribs being joined in the regions of the overlapping portions, and there are at least two projections shaped such that the overlapping portion defined by the two projections is separated from the neutral axis of the rib.

34. An aircraft wing box, wherein the wing box comprises a multiplicity of pairs of half ribs, each pair being joined to form a rib extending from an upper wing skin to a lower wing skin, the wing box comprises two wing box halves, the first wing box half including the upper wing skin and one half rib of each of said multiplicity of pairs of half ribs and the second wing box half including the lower wing skin and the other half rib of each of said multiplicity of pairs of half ribs, each half rib comprises a base and a plurality of projections that extend away from the base, the projections defining a series of troughs and peaks, respective projections of the half rib of each pair overlap with respective projections of the other half rib of the pair thereby defining overlapping portions, the half ribs of each pair being joined in the regions of the overlapping portions by means of respective fasteners, at least the majority of ribs in the wing box are ribs defined by said multiplicity of pairs of half ribs, and the primary structural means of joining the two wing box halves being defined by means of the fasteners joining the overlapping portions between the half ribs.

35. An aircraft wing box, wherein the wing box comprises a pair of half ribs joined to form a rib extending from an upper wing skin to a lower wing skin, each half rib comprises a base and a plurality of projections that extend away from the base, the projections defining a series of troughs and peaks, and respective projections of one half rib overlap with respective projections of the other half rib thereby defining overlapping portions, the half ribs being joined in the regions of the overlapping portions by means of respective fasteners which collectively form at least part of a fixing arrangement that enables the position of joining of the half ribs to be adapted during initial assembly of the half-ribs to accommodate relative movement of the half ribs in a direction substantially parallel to the plane of one of the half ribs.

\* \* \* \* \*